(12) United States Patent
Kendra (10) Patent No.: US 8,496,347 B1
(45) Date of Patent: Jul. 30, 2013

(54) MODULAR LIGHTING SYSTEM AND METHOD

(76) Inventor: Gary Allan Kendra, Northville, MI (US)

( * ) Notice: Subject to any disclaimer, the term of this patent is extended or adjusted under 35 U.S.C. 154(b) by 270 days.

(21) Appl. No.: 12/958,363

(22) Filed: Dec. 1, 2010

(51) Int. Cl.
*F21V 21/00* (2006.01)

(52) U.S. Cl.
USPC ...... 362/217.01; 362/183; 362/219; 362/224; 362/234; 362/249.02

(58) Field of Classification Search
USPC .................. 362/183, 217.01, 219, 223–224, 362/234, 249.02
See application file for complete search history.

(56) References Cited

U.S. PATENT DOCUMENTS

| 7,306,353 | B2* | 12/2007 | Popovich et al. | 362/373 |
| 2007/0091596 | A1* | 4/2007 | Grossman et al. | 362/217 |
| 2009/0098764 | A1* | 4/2009 | Janos et al. | 439/501 |

* cited by examiner

*Primary Examiner* — Stephen F Husar
*Assistant Examiner* — Meghan Dunwiddie (57) ABSTRACT

A modular lighting system and method that can utilize a wide variety of members, connectors, power sources, light sources, and light source covers. The system can be implemented in a variety of different ways, with some embodiments involving fully interchangeable components. Some members can be rigid or substantially rigid to allow substantially rigid assembly structures. Light source covers can be removed and added to customize the individual impact of an individual light source as well as the aggregate display of the entire assembly.

20 Claims, 11 Drawing Sheets

MODULAR LIGHTING SYSTEM AND METHOD

BACKGROUND OF THE INVENTION

The invention relates generally to systems and methods to provide lighting. More specifically, the invention is a system and method for modular lighting (collectively the "system").

Modular lighting typically involves string lighting (which is sometimes referred to as strand lighting) and such lighting is used primarily outdoors. There have been remarkably few changes to string lighting technologies over the past 100 years. String lighting typically relies on plastic coated wires connected in either parallel or serial circuits to deliver power to one or more bulbs from a power source. String lighting does not provide for a lot of opportunities for configuration by the end user. Instead, users of string lighting typically constrain their purposes and goals around the limitations of the particular strand of string lighting. String lighting can be difficult to use in a time efficient manner, but the prior art provides little in terms of alternatives.

The system can be more fully understood upon reading the summary that is discussed briefly below.

SUMMARY OF THE INVENTION

The invention relates generally to systems and methods to provide lighting. More specifically, the invention is a system and method for modular lighting (collectively the "system").

The system can utilize a wide variety of different components and different component configurations to provide modular lighting in desirable manner. The system can use a wide variety of different lighting components that can be powered by a wide variety of power components. A wide variety of structural frames comprised of modular members and connectors can be used to allow users to configure the system. Different embodiments of the system can involve different degrees of modularity and interchangeability. Components can be provided in various kits with predefined assemblies in mind, while still allowing meaningful and robust uses of the underlying components.

The system can be more fully understood upon reading the accompanying drawings that are discussed briefly below.

BRIEF DESCRIPTION OF THE DRAWINGS

Many features and inventive aspects of the system are illustrated in the following drawings:

FIG. 4b is a diagram illustrating an example of a side view of the connectors in FIG. 4a.

FIG. 4e is a diagram illustrating an example of a side view of a member with a single prong male connector that is either permanently or temporarily attached to the member.

The system can be more fully understood upon reading the following detailed description.

DETAILED DESCRIPTION

The invention relates generally to systems and methods to provide lighting. More specifically, the invention is a system and method for modular lighting (collectively the "system").

I. Introduction of Elements and Definitions

Figure 1:
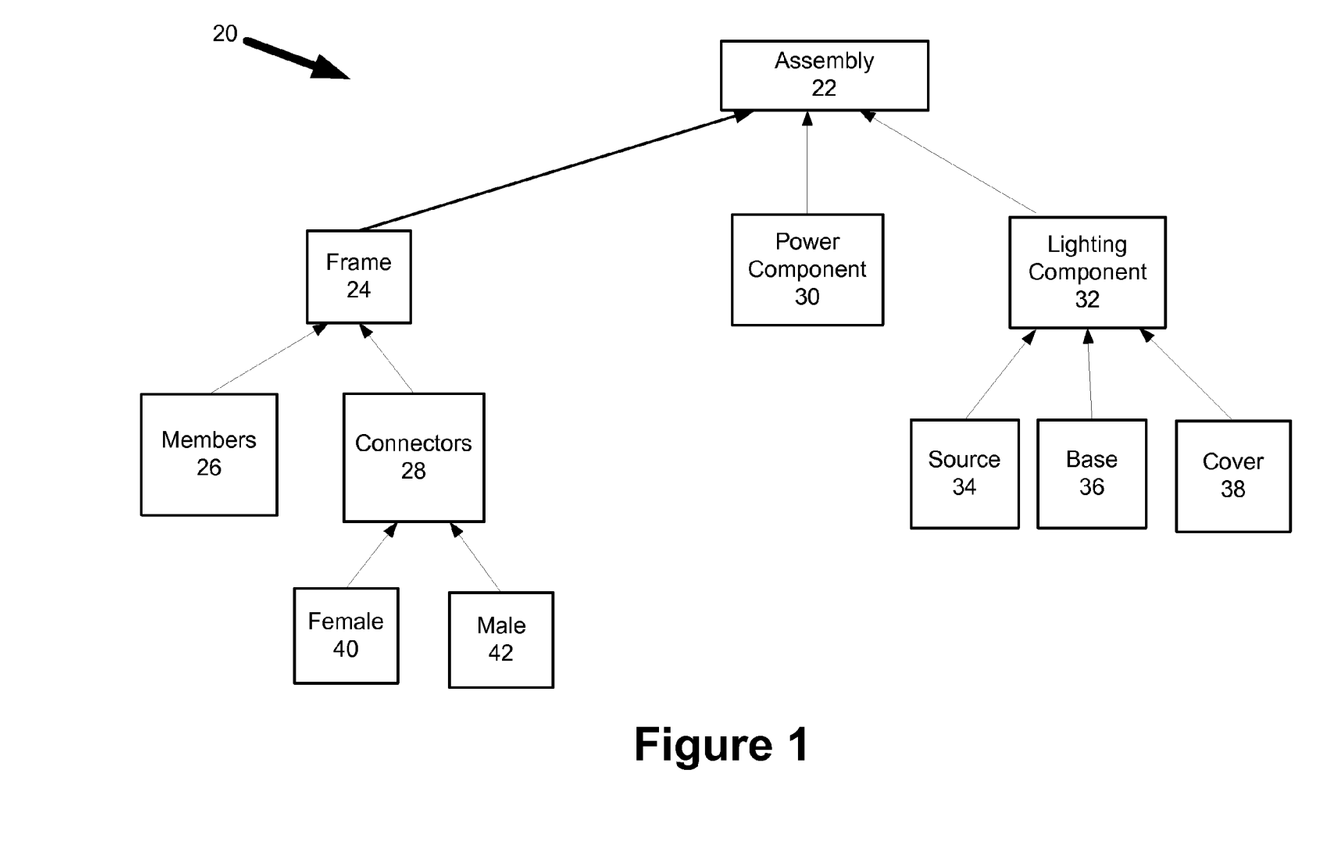
FIG. 1 is a hierarchical block diagram illustrating an example of different components and subcomponents that can be incorporated into the system.

FIG. 1 is a block diagram illustrating an example of some of the different components that can be used in a modular lighting system 20.

A. System

As illustrated in FIG. 1, a system and method for modular lighting (collectively the "system" 20) can involve a wide variety of different combinations of different components. Some embodiments of the system 20 can involve an extremely high degree of interchangeability when it comes to the components of the system 20. Other embodiments may require certain components to be used in certain locations. The degree to which components are interchangeable within a particular embodiment of the system 20 will depend on the geometric complexity/simplicity of the various components, the desired assembly 22, and of the desired operating environment for the assembly 22. In some embodiments of the system 20, the various components may be sold together in a "kit" with the intention of supporting a specific assembly 22. In other embodiments of the system 20, different components can be purchased, assembled, and used in a purely ad hoc basis to form whatever assembly 22 that can be supported by the particular combination of parts. Nothing stops users from implementing hybrid approaches that include both relatively specific kit components and relatively generic components in creating new assemblies 22 of their own. With the modularlity of the system 20, a user can often apply their creativity in utilizing a component with an usual shape (or some other unusual attribute) in a way that is vastly different from the context in which that component was intended to be used. In other words, highly specialized components in one context can be just another generic component in another context.

The system 20 can include a wide range of different assemblies 22, sub-assemblies, components, and methodologies for designing and implementing lighting solutions in a manner that is highly modular, incremental, and customizable. The system 20 can be used for both indoor and outdoor lighting applications.

B. Assembly

An assembly 22 is a collection of system 20 components that are capable of functioning as a unit (i.e. distinct from a collection of parts being stored). The attributes of an assembly 22 are defined by the individual components of the assembly 22 as well as the geometry of the assembly 22. A wide range of different geometrical shapes can be incorporated into an assembly 22.

Assemblies 22 are essentially comprised of three categories of components: frames 24, power components 30, and lighting components 32. The frame 24 of an assembly 22 defines the geometry of the assembly 22. One or more lighting components 32 are used to actual generate the light for the assembly 22, and to configure that light in a manner desired by the user. One or more power components 30 can be used to supply the assembly 22 with power so that the lighting component(s) 32 can function.

C. Frame

Some assemblies will be shaped in largely utilitarian ways to support certain placements of the assembly 22. For example, an assembly 22 could be shaped in such a manner that the bottom portion of the assembly 22 would fit snuggly in a typical gutter of a residential home. This would provide for easy servicing of outdoor holiday lighting. Similarly, assemblies 22 can be shaped to accommodate other spatial configurations such as book cases, steps, railings, and other environments. Assemblies 22 can also be shaped into highly ornamental designs such as a Christmas tree, a pyramid, an animal, or other form in which the assembly 22 is not intended to coincide with an existing spatial structure but is instead serving as a stand-alone geometric structure that provides lighting.

Unlike string lighting which tangles easily and is often difficult to secure to different operating environments, an assembly 22 can be rigid or at least substantially rigid. The rigidity of the assembly 22 is influenced by stiffness of the members 24 making up the assembly.

Frames 24 serve primarily two objectives with respect to the functionality and operation of an assembly 22: (1) geometry and (2) conductivity.

First, frames 24 provide the geometric shape of the assembly 22. The geometric shape of the assembly 22 can be very important in allowing the assembly 22 to function as desired by the user in the operating environment desired by the user. For example, if an assembly 22 is to sit securely on a railing, it needs to have correspondingly suitable geometry for such an operating environment. A different shape is required if the assembly 22 is to sit in the gutter on the roof of a home. Some frames 24 need a specifically configured bottom or support base 23 in order to function in the desired environment. Other frames 24 may involve geometries without a true bottom or top, such as wire-frame of a cube. In many embodiments, the frame 24 is entirely comprised of components that are rigid or substantially rigid. In other embodiments, the frame 24 may include some components that are purposely malleable.

Second, frames 24 provide for receiving power from the power source 30 and delivering power to the light source 32. Some embodiments of frames 34 will involve only conductive components so that the maximum number of different configurations can be functionally supported with operational lighting. In other embodiments, particularly embodiments involve highly specialized geometric shapes, requiring that all portions of all frame 24 components be conductive may be unnecessary.

Figure 2A:
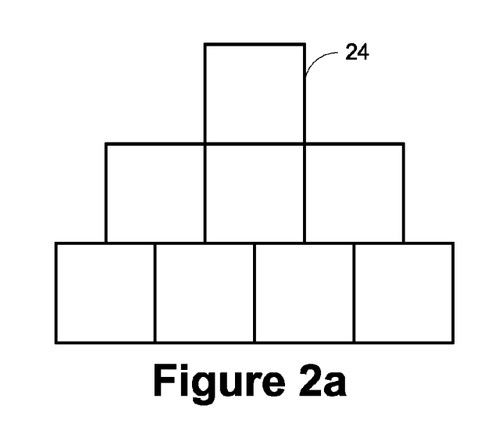
FIG. 2a is a diagram illustrating an example of a frontal view of a frame that is itself comprised of cubic sub-frames.

FIG. 2a is a diagram illustrating an example of a frontal view of a frame 24 that is itself comprised of cubic sub-frames.

Figure 2B:
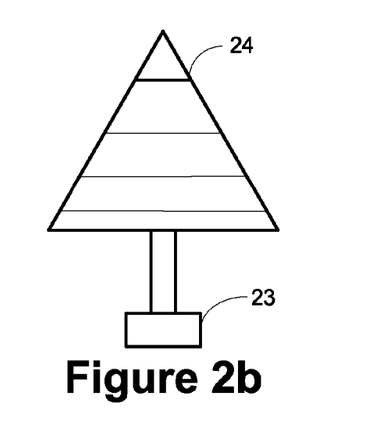
FIG. 2b is a diagram illustrating an example of a frontal view of a frame that is in the shape of a Christmas tree.

FIG. 2b is a diagram illustrating an example of a frontal view of a frame 24 that is in the shape of a Christmas tree.

Figure 2C:
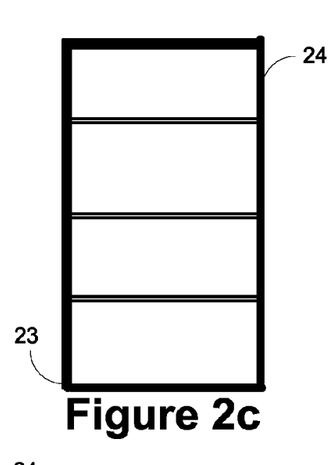
FIG. 2c is a diagram illustrating an example of a frontal view of a frame that is in the shape of a book shelf.

FIG. 2c is a diagram illustrating an example of a frontal view of a frame 24 that is in the shape of a book shelf.

Figure 2D:
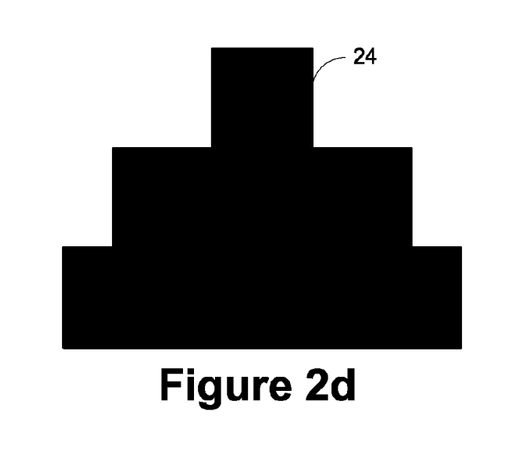
FIG. 2d is a diagram illustrating an example of a frontal view of the frame in FIG. 2d except that front facing components include a solid frontal surface.

FIG. 2d is a diagram illustrating an example of a frontal view of the 24 frame in FIG. 2d except that front facing components include a solid frontal surface. The frame 24 in FIG. 2 is not a "wire frame" with spacing between the frame components. At least with respect to the front face of the frame 24, there is a continuous surface. The frame 24 in FIG. 2d is closer to a three dimensional sculpture. The system 20 can be included in a wide variety of three-dimensional sculpture embodiments for the home, office, or outdoors.

Figure 2E:
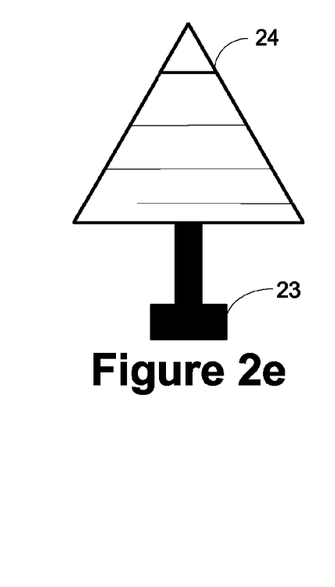
FIG. 2e is a diagram illustrating an example of a frontal view of the frame in FIG. 2b except that the base and stem components of the tree stem are comprised of solid materials.

FIG. 2e is a diagram illustrating an example of a frontal view of the frame in FIG. 2b except that the base and stem components of the tree stem are comprised of solid materials (i.e. not a wire frame 24 surrounded by empty space).

Figure 2F:
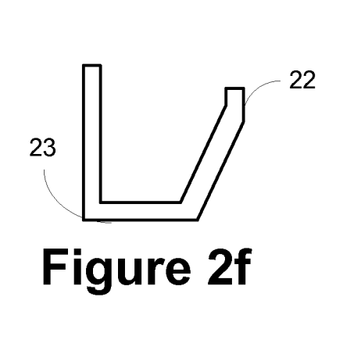
FIG. 2f is a diagram illustrating an example of a side view of a frame design with a base designed to fit in the gutter of a house.
Figure 2G:
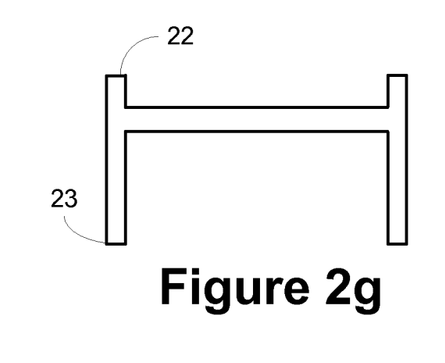
FIG. 2g is a diagram illustrating an example of a front view of the frame in FIG. 2f.
Figure 2H:
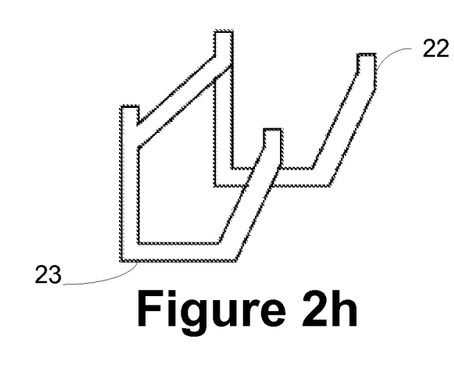
FIG. 2h is a diagram illustrating an example of a perspective view of the frame in FIGS. 2f and 2g.

FIG. 2f is a diagram illustrating an example of a side view of a frame design with a frame base 23 designed to fit in the gutter of a house. FIG. 2g is a diagram illustrating an example of a front view of the frame in FIG. 2f. FIG. 2h is a diagram illustrating an example of a perspective view of the frame in FIGS. 2f and 2g. FIGS. 2f, 2g, and 2h correspond to the assembly 22 displayed in FIGS. 9a and 9b.

In most embodiments, the connections/attachments between members 26 and connectors 28 are temporary, and can be undone. In some instances however, the connections/attachments between a particular member 26 and a particular connector 28 is designed to be permanent.

1. Members

Figure 3:
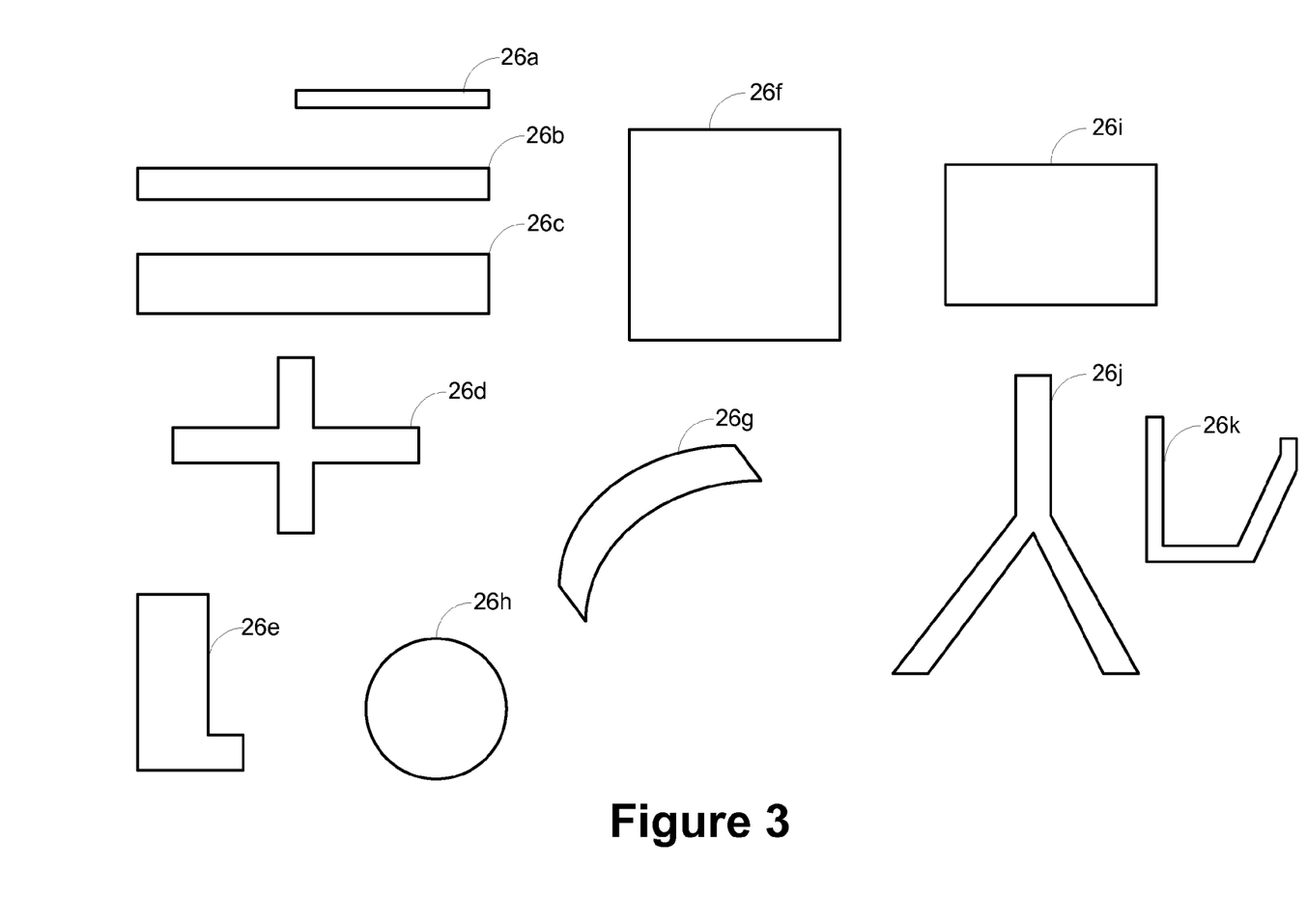
FIG. 3 is a diagram illustrating an example of a side view of different members that can be incorporated into the system.

FIG. 3 is a diagram illustrating an example of a side view of different members that can be incorporated into the system 20.

In most embodiments, members 26 are connected to other members 26 through connectors 28. In some embodiments, it is possible to directly connect members 26 together both structurally and conductively without an intervening connector 28. In many embodiments, some members 26 will have connectors 28 permanent attached.

Members 26 provide the structural integrity of the frame 24 (in conjunction with the connectors 28 that connect the members 26). As part of the frame 24, members 26 may also need to conduct power along the body of the member, depending on precisely where the member 26 is located. Some members 26 are fully conductive members 26. Other members 26 may be only partially conductive members 26, with certain non-conductive areas. Still other members 26 may be designed and intended exclusively for structural support of the frame 24 geometry, and as such be fully non-conductive members 26.

The system 20 can use a wide variety of different members 26 in a wide variety of different shapes with a wide variety of different attributes. Members 26 provide users of the system 20 with the ability to customize different shapes because members 26 can be joined together (through the use of connectors 28) in highly interchangeable ways in building an assembly 22. The more simple the shape of the members 26, the greater the ability to combine the members 26 in different and meaningful ways. More complex members 26, such as a member 26 with more than two end points (see element numbers 26d and 26j in FIG. 3 for examples) or a member 26 that is not substantially straight (see element numbers 26g and 26k in FIG. 3 for examples) will be very desirable in particular circumstances, but often less valuable as a generic component. The number of differently shaped members 26 that can be included in the same assembly 22 is limited only by geometric constraints. For complex geometric shapes, having more than 3, 4, or 5 different shapes would not be unusual. Some members 24 may be curved in shape or incorporate curved segments within the member 24. Many embodiments of members 24 can be limited to non-curved shape.

Some members 24 can be shape-retaining members. Such members 24 are either rigid or at least substantially rigid so that the shape of the member 24 cannot easily be modified. In contrast, some members 24 can be shape-flexible members 24, designed to allow a change in shape either through the force of a human hand, use of a pair of pliers, or through mechanical adjustment means such as a bolt, screen, latch, etc.

Some members 24 can be conductive members. Such members 24 are conductive throughout the length of the member 24, and thus a connector 26 can be attached to potentially any portion of the member. Other members, particularly those with a specific purpose within a specified assembly 22 may not necessarily be conductive throughout the assembly 22. For example, if a particular member 22 serves as a support structure for the assembly 22, it may not be necessary or useful for the member 22 to be conductive throughout the member 22.

In many embodiments of the system 20, members 24 are connected to each other through connectors 26 which serve to conduct power through the assembly 22. In some embodiments, members 24 can be configured to fasten to other members 24 without any connectors 26. In still other embodiments, connectors 26 can be built into the members 24 and are not separable from the members 24.

Members 24 can be comprised of a wide variety of different materials. Some members 24 can be comprised of coated steel tubes. Other members 24 may be comprised of hollow plastic rods. Different operating environments may make certain material compositions better than others. Conductivity attributes and the type of light source 34 can also have an impact on these variables.

Many highly generic members 26 are going to involve straight and flat members 26. In some frames 24, there may be no instance of a curved member 26 or a member 26 possessing a substantially curved segment. In other embodiments involving frames 24 that are more complex in terms of geometric shape, more specialized members 28 can be required. In many embodiments, the flat side of a member 26 or a subassembly of members 26 and connectors 28 is flat, and intended to serve as suitable base on which the frame 24 and the overall assembly 24 can sit securely. In other embodiments, the frame 24 may be intended to hang down from a external support structure, such as a railing.

Relatively unusually shaped members 26 can be sold to users as parts of special kits intended to satisfy the applicable unusual geometric attribute desired by the user. Relatively generic shaped members 26 can be sold as commodities to facilitate the ability of users to design their own creations. Users can then create assemblies 22 using combinations from both specialized kits as well as generic components to create their own creative expressions using complex geometric shapes.

2. Connectors

A connector 28 is what connects one member 26 to another member 26 in the frame 24. Connectors 28 can serve to physically connect one member 26 to another member as well as conductively (for the ultimately purpose of powering the light(s) 34) connect one member 26 to another member 26. Some connectors 28 can be non-conductive members 28, but many if not most connectors 28 will be conductive connectors 28 if the particular connector 28 is going to be capable of serving the function of a generic component. A non-conductive connector 28 or a partially conductive connector 28 is not as useful as a generic component because the lack of connectivity limits where in a frame 24 the non-conductive connector 28 can be used. Most connectors 28 are going to be either male 42 or female 40, although not all connecting technologies known in the art incorporate such distinctions.

Figure 4A:
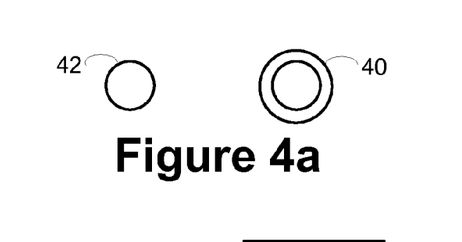
FIG. 4a is a diagram illustrating an example of a frontal view of a single prong male connector side by side with a corresponding female connector.

FIG. 4a is a diagram illustrating an example of a frontal view of a single prong male connector 42 side by side with a corresponding female connector 40.

Figures 4B, 4E:
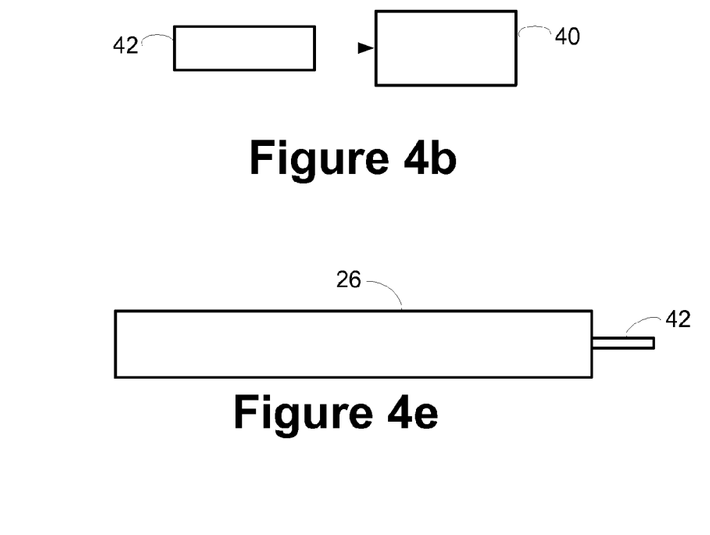

FIG. 4b is a diagram illustrating an example of a side view of the connectors in FIG. 4a.

Figure 4C:
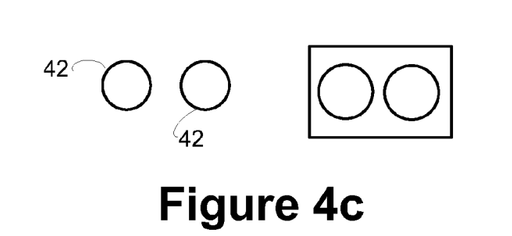
FIG. 4c is a diagram illustrating an example of a frontal view of a double pronged male connector side by side with a corresponding female connector.

FIG. 4c is a diagram illustrating an example of a frontal view of a double pronged male connector 42 side by side with a corresponding female connector 40.

Figure 4D:
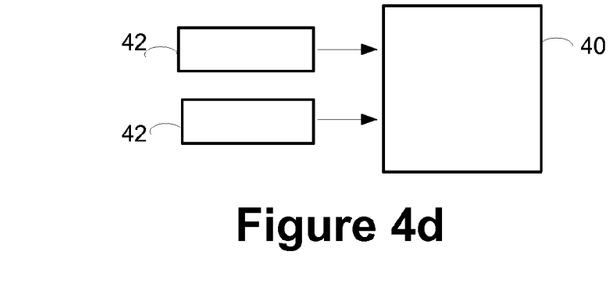
FIG. 4d is a diagram illustrating an example of a side view of the connectors in FIG. 4c.

FIG. 4d is a diagram illustrating an example of a side view of the connectors in FIG. 4c.

FIG. 4e is a diagram illustrating an example of a side view of a member 26 with a single prong male connector 28 that is either permanently or temporarily attached to the member 26.

Figure 4F:
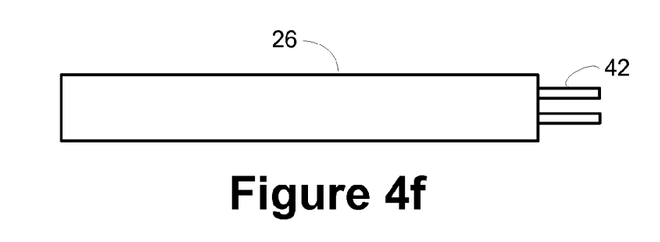
FIG. 4f is a diagram illustrating an example of a side view of a member with a double pronged male connector that is either permanently or temporarily attached to the member.

FIG. 4f is a diagram illustrating an example of a side view of a member 26 with a double pronged male connector 42 that is either permanently or temporarily attached to the member 26.

D. Power Source

A power component 30 which can also be referred to as a power source 30 is virtually any component that can be connected to the assembly 22 in order to provide power to allow the lights 34 to work. The power source 30 is secured (the terms fixed or attached could also be used) to the assembly 22 though a connector 28 in the frame 24. The securing of the power source 30 to the connector 28 is typically done in a temporary manner, although alternative configurations can be desirable in certain circumstances.

Figure 8:
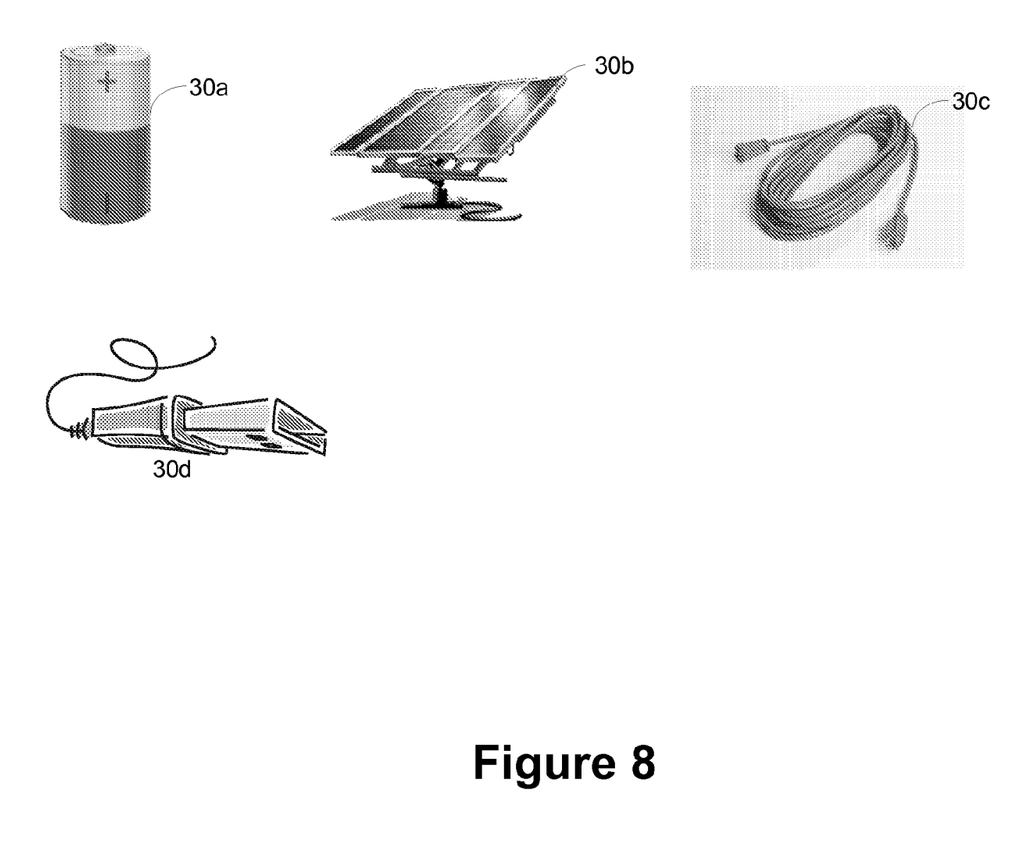
FIG. 8 is a diagram illustrating some examples of different power sources than can be incorporated into the system.

FIG. 8 is a diagram illustrating some examples of different power sources than can be used to power the assembly 22. In many embodiments, multiple power sources 30 can be used to power the assembly 22. Examples of potential power sources 30 can include: (a) a battery 30a of virtually any type; (b) a solar power module 30b that includes a power line secured to the connector 28 (i.e. the solar panels need not actually be placed on the frame, although they could be); (c) a traditional power cord 30c; (d) a USB power cord 30d; or (e) any other power cord capable of connecting with the connector 28 and delivering power to the assembly 22.

Combinations of different power sources 30 can also be used. For example, some embodiments of the assembly 22 could be powered alternatively using solar power on sunny days and wind power on windy days. Both power sources could be used to charge a batter that is used on days when it is neither windy nor sunny.

The power requirements for the system 20 will depend on what types of light sources 34 are used. One of the benefits of using LED lights 34c is that low voltage power sources 30 can be used. Low voltage lighting is generally safer.

The power source 30 (regardless of whether it utilizes solar power or not) can use a dark/light sensors 30 for low cost all-night operation while automatically turning off the lights during the day time when it is light out. Timers can be used and integrated into the power source 30 mechanism to achieve similar outcomes.

E. Lighting Components

Figure 7A:
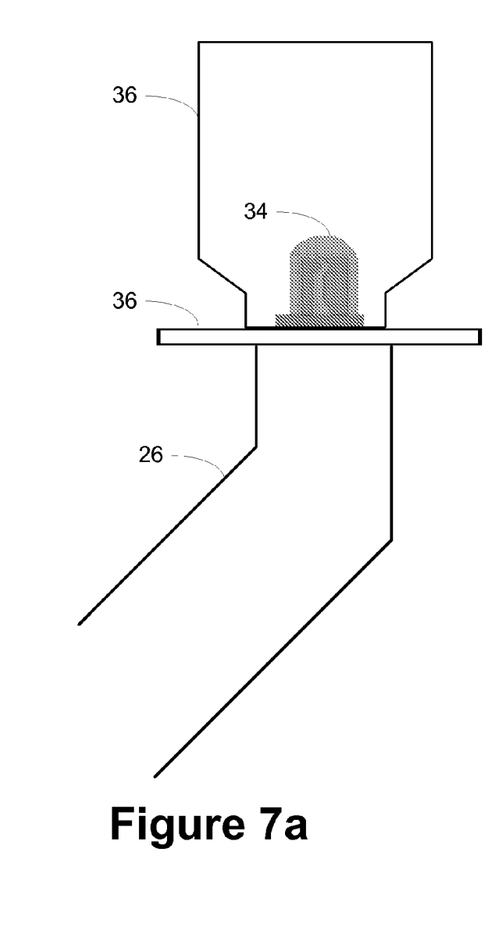
FIG. 7a is a diagram illustrating an example of an LED light source underneath a light cover that is attached to a cover base that is attached to a frame.

Lighting components 32 are responsible for the functionality of generating light and configuring the visual impression of that light. Lighting components 32 for the system 20 can include a light source 34, a cover base 36, and a cover 38. FIG. 7a is a diagram illustrating an example of an LED light source 34 underneath a light cover 38 that is attached to a cover base 36 that is attached to a frame 24.

1. Source

A light source 34 (which can also be referred to as the light, lamp or bulb) is the mechanism that actually generates the light for the assembly 22.

Figure 5:
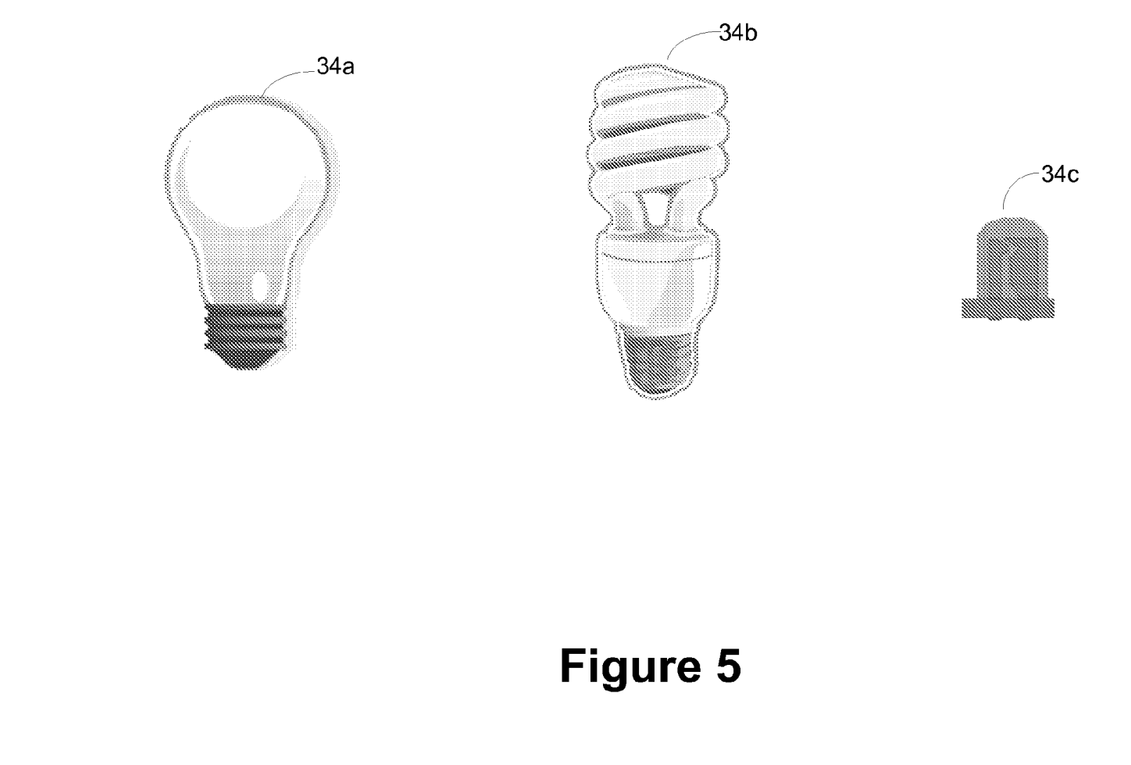
FIG. 5 is a diagram illustrating some examples of different light sources that can be incorporated into the system.

FIG. 5 is a diagram illustrating some examples of different light sources that can be incorporated into the system 20. In a preferred embodiment, an LED light 34c is used because LED lights 34c can be powered with low voltage, which can significantly impact the operating safety requirements for the connectors 28 within the frame 24. However, additional light sources 34 can also be used. Incandescent bulbs 34a, fluorescent bulbs 34b, and other light sources 34 can also be incorporated into the system 20. A single assembly 22 can involve multiple different types of light sources 34.

In some embodiments, an array of lights, such as an LED array, can serve as the light source 34. In some embodiments, multiple different types of light sources 34 can be used as the same location on the assembly 22. Some embodiments of the system 20 can be configured to allow for visual effects such as strobe lighting or activation by motion sensor, if desired.

In many embodiments, lights 34 attach to the assembly 22 via a connector 28. In some embodiments, the light 34 may connect to a conductive base 36 which in turn connects with a connector 28. However, in most embodiments of the system 20, the base 36 is twisted onto a member 26 and the only purpose of the base 36 is to secure the cover 38. Both the base 36 and cover 38 are discussed below.

2. Cover

The system 20 can be implemented in such a way as to enhance the ability of users to customize the visual effect of the light being disseminated from the light source 34 through a cover 38 (which can also be referred to as the "light cover" 38).

Such a configuration allows the user to change the color of light that is illuminated or the images that are illuminated without changing the light source 34.

Figure 6:
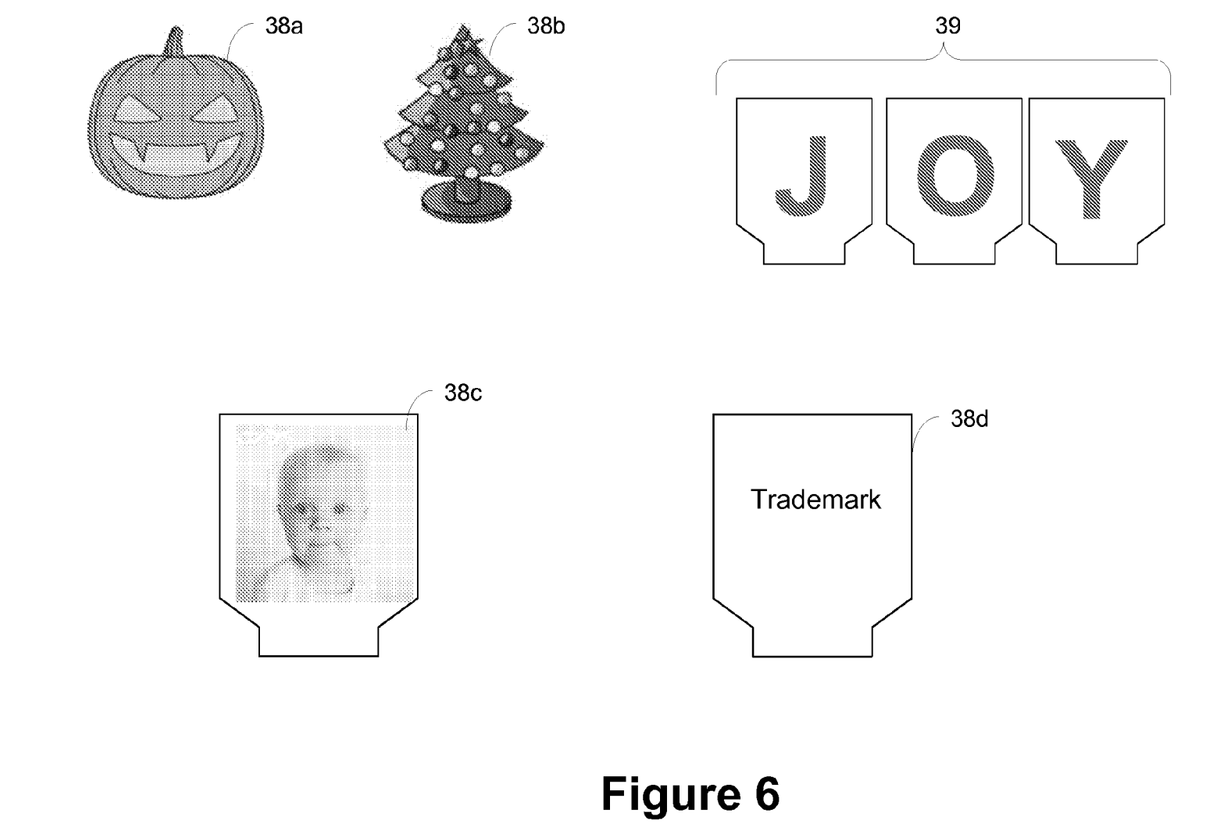
FIG. 6 is a diagram illustrating several examples of different light covers that can be incorporated into the system.

FIG. 6 is a diagram illustrating several examples of different light covers that can be incorporated into the system 20. Some covers 38 will have unique shapes relating to the image being conveyed. For example, the jack-o-lantern cover 38a and the Christmas tree cover 38b are geometrically shape and colored to convey a particular visual image. Other covers 38 may rely exclusively on an image embedded in the cover 38 and not the geometry of the cover 38 to impact the overall image. For example, a generically shaped cover with a personal photo 38c or a generically shaped cover 38 that illustrates a visually based trademark, such as a word, a symbol, or combination thereof. As illustrated in FIG. 6, multiple covers 38 can be used in the aggregate to display an aggregate communication 39. In FIG. 6, three covers 38 are used in the aggregate to display the word "JOY".

Covers 38 can be used to control the color that is illuminated from the light 34. Covers 38 can be used to display decorative indicia, such as words, numbers graphics, photographs, symbols, logos, and any other form of visual perception.

Covers 38 can be comprised of a variety of different materials, but plastic is often preferable to glass for a variety of reasons. Covers 38 can be attached to a cover base 36 using a variety of different methodologies, including twisting the cover 38 into the base 36, snapping the cover 38 into the base 36, screwing the cover 38 into the base 36, securing the cover 38 into the base 36 with a screw, or any other suitable securing technology known in the art (i.e. clasps, latches, etc).

In some embodiments of the system 20, the indicia (or display attribute) on the covers 38 can be directly customized by users. For example, a website or email address could be used to receive images to be embedded into the cover 38. In some embodiments, the cover 38 can be machined from a 3-D printer that could be available at a kiosk or some similar type of retail environment. Stickers can also be used to configure a cover 38.

In most embodiments, the securing of a cover 38 to the base 36 is temporary, but in some embodiments, permanent attachments can be incorporated into the processing of the system 20.

3. Base

As discussed above, the cover 38 can an important mechanism for the customization and configuration of the assembly 22. Use of the covers 38 in that manner allows users to change the illumination generated by the assembly without changing any of the light sources 34.

The cover base 36 which can also be referred to as the base 36 further enhances this modular flexibility. The cover 38 can exceed the applicable surface size of the member 26 because the cover 38 relies not on the member 26 for support, but on the base 38.

Bases 36 and covers 38 can be manufactured in predefined sizes to facilitate the interoperability that results from standardization.

The system 20 can be implemented in such a way as to enhance the ability of users to customize the visual effect of the light being disseminated from the light source 34 through the cover 38. The base 36 supports this functionality by providing structural support to the cover 38. The base 36 is responsible for physically attaching to the frame 24, enhancing the ability of covers 38 to be truly generic since the covers 38 attach to the base 36, and instead of the wide variety of different frame 24 components and component configurations.

In many embodiments, the base 36 is only temporarily fixed/secured/attached to a member 26, but in alternative embodiments, more permanent attachments are possible.

Figure 7B:
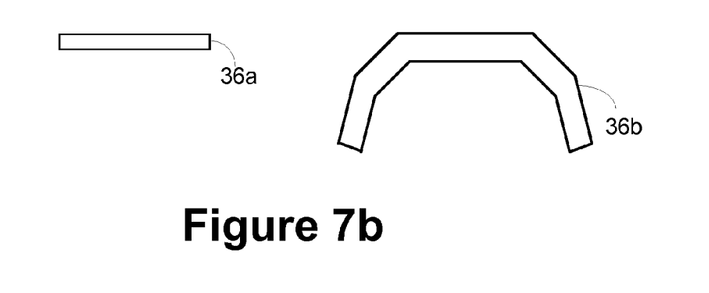
FIG. 7b is a side view diagram illustrating some examples of different light bases that can be incorporated into the system.

FIG. 7b is a side view diagram illustrating some examples of different light bases that can be incorporated into the system 20. Many bases 36 will have a shape similar to a generic flat surface based 36a, but other configurations are possible. For example, a base 36b could extend downward if such a configuration was desirable either for visual effect or to accommodate a particular cover geometry.

Figure 7C:
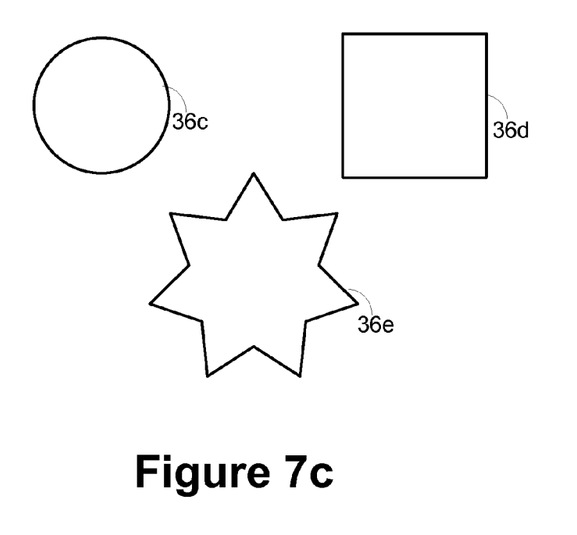
FIG. 7c is a top view diagram illustrating some examples of different light bases that can be incorporated into the system.

FIG. 7c is a top view diagram illustrating some examples of different light bases that can be incorporated into the system.

II. Operational Attributes

Conventional string lighting suffers from several operational disadvantages. It has nonetheless been very popular to use in certain contexts, such as outdoor holiday lighting during Christmas time. However, convention string lights suffer from a lack of interchangeability, a lack of modularity, and a lack of opportunity for incremental action on the part of the user. Many of such weaknesses result from the fact that string lighting components serve multiple functions simultaneously. In contrast, the components of the system 20 can allocate operational responsibilities in a specialized, modular, and incremental manner. This allows different types of components to be largely interchangeable with components of the same type.

A. Flexibility does not Require Tangled Strings of Lights

The difficulty in untangling string lights prior to their use is a significant deterrent to the use of string lighting. It is a hassle to begin an otherwise exciting project such a decorating with lights with the task of just placing your available resources in a condition to be used. In the prior art, string lighting became commonly used in contexts such as outdoor lighting because outdoor lighting requirement the flexibility of a string light to accommodate for different shapes and sizes of homes and trees. Thus, in terms of string lighting, the capacity to become tangled was an undesired by product of the need for flexibility.

Figure 9A:
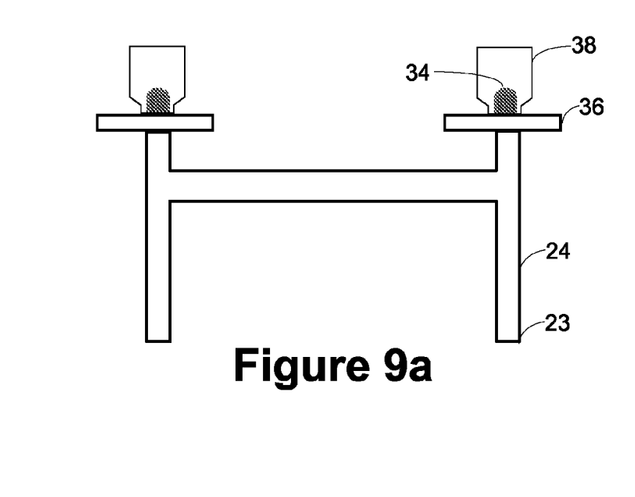
FIG. 9a is a diagram illustrating an example of a front view of an assembly with two lighting components.
Figure 9B:
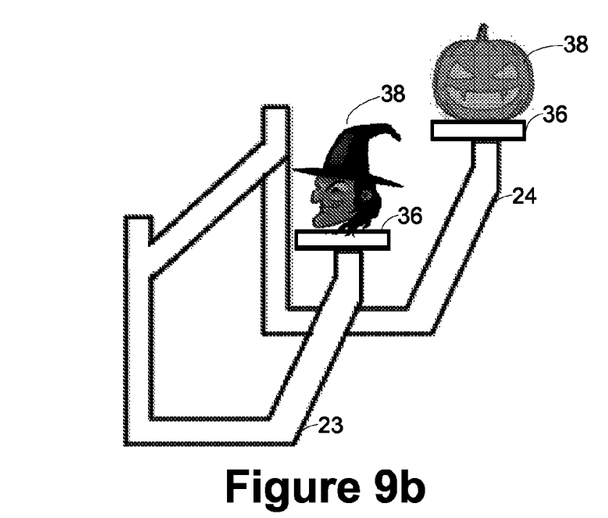
FIG. 9b is a diagram illustrating an example of a perspective view of an assembly with two lighting components relating to the holiday of Halloween.
Figure 9C:
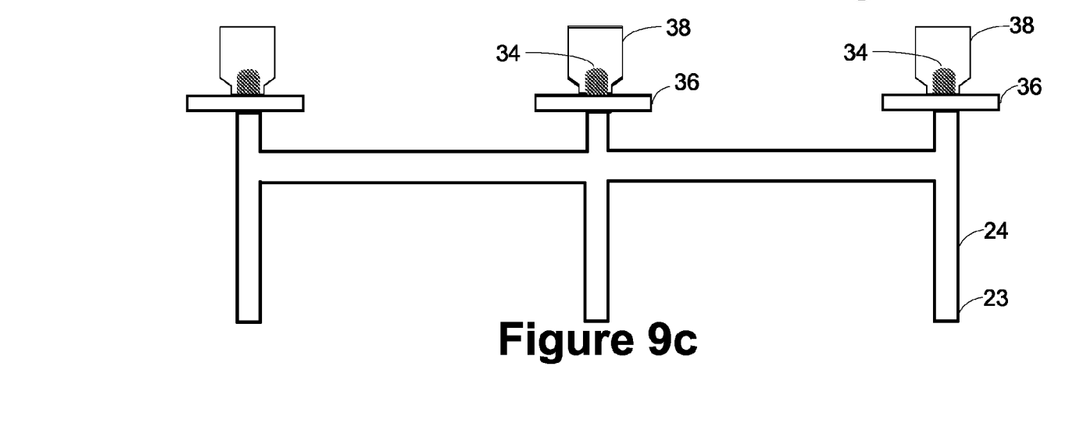
FIG. 9c is a diagram illustrating an example of a front view of the assembly disclosed in FIG. 9a where an additional lighting component has been added to the assembly along with corresponding members and connectors for the frame.

In contrast, the system 20 can provide flexibility without the undesired problem of tangled strings. Members 26 and connectors 28 can be rigid or substantially rigid, which avoids the issue of tangling, while the ability to configure the shape of the frame 24 achieves the advantages of flexibility. In the context of highly particular operating environments, some of the frame 24 components can be highly specialized. For example, the base 23 of the assembly 22 in FIGS. 9a-9c is designed to secure the assembly 22 in a gutter of a roof of a home. Highly specialized components can be used fruitfully in more generalized operating environments, and highly particularly operating environments can still involve largely generic components.

B. Incremental Scalability

Even the shortest string of string lighting is typically several feet in length. In the context of string lighting, being even a "bit" short typically requires that an entire new string of lights be attached, even if the additional new string is far longer than is what is actually required.

In contrast, the highly modular system 20 can greatly enhance incremental scalability options. With modular system components, it is possible to incrementally scale upwards or downwards to address changes in capacity. Instead of purchasing an entire 5 foot long string of lights for 10 inches of desired coverage, with the system 20, one can simply add the appropriate configuration of member(s) 26 and/or connector(s) 28 to the frame 24. Highly generic members 26 such as are illustrated by elements 26a, 26b and 26c in FIG. 3 can be produced in a wide variety of different sizes and dimensions. This allows users of the system 10 to expand a frame that is currently 5 feet long by a meager 5 inches if that is their desired goal. The larger the diversity of available frame 24 components are, the more substantial this advantage can be.

C. Incremental Interchangeability

There are numerous technical issues in a string light that can result in a user discarding the entire string. This often occurs even if the issue is replacement of a single bulb on the string, or if there is a single short in one location in the string. The atomic unit of operations for a string light in the eyes of many users is the entirety of the string. Replacement an individual bulb is challenging to many, even if they are able to identify which bulb or bulbs are in need of replacement. Rectifying a short in the wire itself is often not worth the time to those highly skilled and efficient in repairing such issues. String lighting typically results in a "discard and repurchase" approach to product defects and needed repairs.

In contrast, the system 20 can facilitate the replacement of problematic components without discarding properly functioning components. A faulty connector 28 can be replaced with a new connector 28. A bent member 26 can be replaced with a member 28 that is not bent. A cracked cover 38 can be replaced with a cover that is not cracked 38. The modular approach to lighting has the reinforcing benefit of encouraging users to have additional components available for the use in alternative and creative designs, but such components can also serve as replacement components.

D. Incremental Customizations

Traditional Christmas string lights are popular, despite the obstacles associated with their use. However, string lights thwart the possibility of using string lights in other contexts because string lights are not designed to be configurable. Put another way, Christmas lights involve a totally different color scheme than Halloween or the Fourth of July. It is generally speaking, not possible for a user to somehow transform their December Christmas lights into acceptable Halloween lights in October.

In contrast, the system 20 allows users to customize the visual impact of the lighting through the use of light covers 38. As discussed above, covers 38 can involve different colors, graphical displays, and even aggregate communications across multiple covers 38 acting in concert with each other. The system 20 provides users with the ability to incrementally customize their assemblies 22 in terms of the visual impact of the lights through the covers 38 and in terms of the geometry of the assembly 22, through the aggregate geometry of the members 26 and connects 28 that make up the frame 24. By allowing users to configure the system 20 in ways that they desire, the system 20 actually encourages users to use lighting solutions and to express themselves through the use of lighting.

III. Process Flow Views

The system 20 can be implemented using a wide variety of different process steps. One of the implications of a highly modularized approach to lighting is that changes can be made on a incremental basis. Different covers 38 can be added or removed accommodate different times of year. Different power sources 30 can be added or removed to accommodate different weather conditions. The geometry of the frame 24 comprising the assembly 22 can be modified incrementally to add additional capacity as necessary. Assemblies 22 or sub-assemblies can be maintained over years, or repeatedly broken down into atomic-level components such as individual members 26 and connectors 28. No flow chart is capable of illustrating all the numerous potential variations that those of ordinary skill in the art can and will conceptualize as a result of learning about this system 20. Nonetheless, several general concepts can be illustrated in such process flow views.

A. Example #1

Figure 10A:
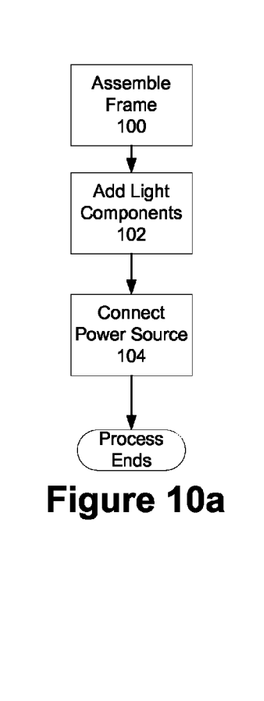
FIG. 10a is a flow chart diagram illustrating an example of a process for assembling a modular lighting system.

FIG. 10*a* is a flow chart diagram illustrating an example of a process for assembling a modular lighting system 20.

At 100, the frame 24 is assembled. In many embodiments, the design and assembly of the frame 24 can be 100% user defined. The user simply sorts through the available members 26 and connectors 28 in his or her possession and engages in the creative process of visualizing what the desired geometry of the frame 24 should be, keeping in mind the desired locations for the lighting component(s) 32. The more complex the geometry of the frame 24, the more likely that a specialized kit of at least some members 26 and connectors 28 may be required. In any case, the design of the frame 24 at 100 can be the result of purely ad hoc decision decisions by the user, the result of a user following the instructions of an implementation specific kit of components, or a hybrid approach that involves a combination of each to some degree or another.

At 102, one or more lighting components 32 are added. This can involve choosing from a variety of different bases 36 that typically temporarily attached to one or more locations on the frame 24. That process is typically followed with the temporary attachment of one or more lights 34 to the base(s) 36. Covers 38 can then be added to the various bases 36. The ability to switch covers 38 without otherwise changing the structure of the frame 24 can be a significant advantage over conventional string lighting.

At 104, one or more power sources 30 can be attached to the frame 24 completing the assembly 22. Power sources 30, like any other component of the assembly 22 can be swapped in and out on a largely interchangeable basis. This makes it easier to for example, replace undercharged batteries or better utilize sources of weather-dependent electricity. For example, the assembly 22 could be switched from a wind-based power source to a solar-based power source on a sunny day, and switched back to a wind-based power source on a windy day.

B. Example #2

Figure 10B:
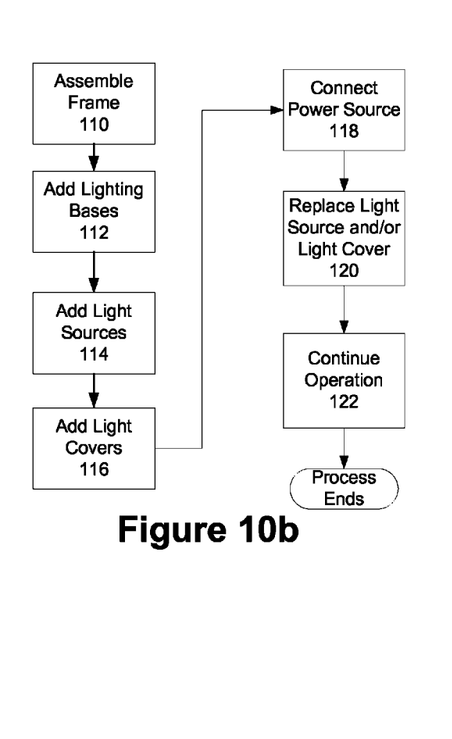
FIG. 10b is a flow chart diagram illustrating an example of a process for assembling a modular lighting system, swapping out certain components, and then continuing to operate the system.

FIG. 10*b* is a flow chart diagram illustrating an example of a process for assembling a modular lighting system 20, swapping out certain components, and then continuing to operate the system 20.

At 110, the process of assembling the frame 24 can begin. Although the highly modular nature of the system 20 can literally provide users with the ability to just start connecting members 26 and connectors 28 together and see what they end up with, it is often desirable to plan ahead, particularly if the desired assembly 22 is intended to accomplish a particular purpose or operation in a particular operating environment. In many embodiments of the system 20, the act of fixing or securing a member 26 to a connector 28 or another member 26 is temporary. The attachment is temporary, and subject to undoing by the user or subsequent users at a later time. However, in some embodiments, it may be desirable to more permanently attach one component in the frame 24 to another 24. In assembling the frame 24 at 110, some of the attachments may be permanent. Different environments and embodiments may call for a greater propensity of using permanent attachments to a greater or lesser degree.

At 112, lighting bases 36 can then be added. These are often added after the frame 24 is fully constructed. However, in many embodiments, nothing prevents a user from building outward and adding lighting bases 36 as part of the process for assembling the frame 24. Just as frame 24 components can be attached with different degrees of permanence, so to can lighting bases 36 to assemblies. Some embodiments of lighting covers 38 can involve highly expensive and fragile crystals for example. In such contexts, extra steps may be utilized to secure such covers 38 from damage, and such steps may impact the mechanisms by which the lighting bases 36 are attached to the frame 24.

At 114, light sources 34 can then be attached to the lighting bases 36. The specific process for doing so will typically depend on the specific attributes of the source 34 and the base 36. Just as some users may find it desirable to add bases 36 to the frame 24 before the frame 24 is fully complete, some users may find it desirable to add lights 34 to those same bases 36 while the frame is still incomplete.

At 116, light covers 38 can be attached to the light bases 36, covering the light sources 34. In some embodiments, users may find it desirable to wait until after the power is connected at 118 before adding of light covers 38 at 116. This permits the user to test the lights 34 prior to spending time attaching the covers 38.

At 118, one or more power sources 30 can be attached to the frame 24 in order to power the assembly 22. In many outdoor operating contexts, a solar powered power source 30*b* is highly desirable, since this allows the assembly 22 to operate in a self-contained matter.

At 120, after the assembly 22 is in operation, the modular and interchangeable nature of the components can allow users to modify one or more components in a relatively easy fashion. For example, a light source 34 could be replaced or a light cover 38 changed. A different power source 30 could be used. Members 26 and connectors 28 could be added to the frame 24. In the context of the system 20, such modifications are often far easier than they would be in the context of string lighting which does not readily support such incremental activities.

At 122, the assembly 22 can continue to operate with the new configuration. Only the components in need of changing needed to be touched. Other components were not disassembled or otherwise impacted by the modifications at 120. This results in both ease of use and efficient use of time for users. Such advantages provide users with more incentives to utilize lighting in creative ways.

C. Example #3

Figure 10C:
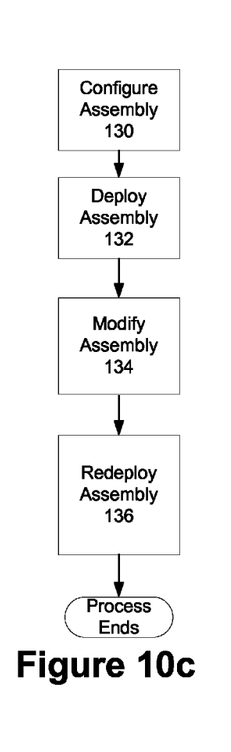
FIG. 10c is a flow chart diagram illustrating an example of process for configuring, deploying, modifying, and redeploying the assembly.

FIG. 10*c* is a flow chart diagram illustrating an example of process for configuring, deploying, modifying, and redeploying the assembly 22.

At 130, the assembly is configured 130. This step in the process can involve both the conceptual design of the desired assembly 22 as well as its physical construction from the available lighting components 32, power components 30, and frame 24 components, i.e. members 26 and connectors 28. In many embodiments of the assembly 22, the assembly 22 is configured to operate in a particular operating environment.

For example, the assembly 22 in FIGS. 9a, 9b, and 9c has a base 23 designed to fit in the gutter of a house. Other assemblies 22 can be configured to accommodate being hung on a railing, staked into the ground, framing a book case or other furniture, surrounding a picture frame, or virtually any other use. Other embodiments and implementations of the assembly 22 may involve far fewer environmental issues, and simply need a flat surface for support. Such considerations should be addressed when possible, during the assembly configuration process at 130.

At 132, the assembly 22 can be deployed to its desired operating environment. For example, the assembly 22 in FIGS. 9a-9c could be lowered into a gutter on the roof from a second floor window. This could be done by climbing on the roof, or by using a rope or other tool to lower the assembly 22 into the desired location.

At 134, the assembly 22 is modified from its original configuration. For example, in the context of the assembly 22 in FIGS. 9a-9c, the user may want to change from Halloween lights in October to Christmas lights in December. Instead of purchasing and deploying different sets of string lights with different color attributes, the assembly 22 can be retracted, the covers 38 replaced with covers 38 addressing the desired seasonal decorations, and the assembly 22 is then redeployed. The change involves a relatively small number of changes, instead of an entirely additional replacement string of lights. Nor does the user have to spend time untangling the new lights, or making futile attempts to prevent the tangling of the lights just taken down.

At 136, the assembly 22 can be re-deployed in the same manner that it was deployed in 132.

IV. Alternative Embodiments

In accordance with the provisions of the patent statutes, the principles and modes of operation of this invention have been explained and illustrated in a variety of preferred and alternative embodiments. However, it must be understood that this invention may be practiced otherwise than is specifically explained and illustrated without departing from its spirit or scope.

The system can be implemented in a wide variety of different embodiments involving a wide variety of different components and configurations. A wide variety of different materials can be used to construct the components and different functional specifications can be incorporated into the performance of the apparatus as desired. The system can benefit from and incorporate future technological developments relating to lighting technology, power delivery systems, material science innovations, and other technology areas.

The system can also be implemented in conjunction with prior art systems. For example, the system could be integrated to support functioning alongside string lights, and even serve as a power conduit for such lights.

The invention claimed is:

1. A modular lighting system, comprising:
a plurality of connectors;
a plurality of members, said plurality of members including a shape-retaining member and a conductive member, wherein said shape-retaining member is at least substantially rigid, wherein said conductive member is conductive throughout the length of said conductive member, wherein said connectors are attached to said members;
a power source, wherein said power source is secured to at least one said connector attached to at least one said member;
a light source, wherein said light source is secured to at least one said connector attached to at least one said member; and
a cover, wherein said cover is secured over said light source;
wherein said plurality of members include a plurality of coated steel tubes and a plurality of hollow plastic rods.

2. The modular lighting system of claim 1, further comprising a frame, wherein said frame is comprised of said plurality of members, wherein said frame is at least substantially rigid, wherein said power source is temporarily secured to at least one said connector, wherein said light source is temporarily secured to at least one said connector, and wherein said cover is temporarily secured over said light source.

3. The modular lighting system of claim 1, wherein said power source is a solar power module that includes a power line that is at least temporarily secured to at least one said connector.

4. The modular lighting system of claim 1, further comprising a plurality of light sources, wherein each said light source includes at least one LED.

5. The modular lighting system of claim 1, wherein at least a subset of said members are shaped to form a substantially flat base for said modular lighting system.

6. The modular lighting system of claim 1, wherein said cover is machined from a 3-D printer.

7. The modular lighting system of claim 1, further comprising a base that is least temporarily secured to at least one said member, wherein said cover is adapted to be secured by at least one of: (a) screwing said cover into said base; (b) twisting said cover into said base; and (c) snapping said cover into said base.

8. The modular lighting system of claim 1, wherein said cover includes a decorative indicia, said decorative indicia including at least one of an alphanumeric character, a symbol, or a graphic.

9. The modular lighting system of claim 8, further comprising a plurality of light sources and a plurality of covers, wherein said plurality of covers provide an aggregate communication.

10. The modular lighting system of claim 1, wherein said plurality of members and said plurality of connectors have no predetermined configuration.

11. The modular lighting system of claim 1, wherein each of said plurality of members are configured into one of a plurality of shapes, and wherein said number of shapes exceeds 3.

12. The modular lighting system of claim 1, said plurality of connectors including a plurality of female connectors and a plurality of male connectors.

13. The modular lighting system of claim 12, wherein no said member is secured to more than two said male connectors and wherein no said member is secured to more than two said female connectors.

14. The modular lighting system of claim 1, wherein no said member includes a substantially curved segment.

15. The modular lighting system of claim 1, wherein at least one said member is adapted to be manually shaped by a human hand.

16. The modular lighting system of claim 1, wherein at least a subset of said plurality of members are not sold together as part of a kit.

17. The modular lighting system of claim 1, wherein a display attribute on said cover is customized in accordance with a user request.

18. The modular lighting system of claim 1, wherein at least two or more said members are shaped to form a base to be placed in a gutter on the roof of a building.

19. A modular light system, comprising:
- a plurality of connectors, said plurality of connectors including a plurality of female connectors and a plurality of male connectors;
- a plurality of members, said plurality of members including a plurality of shape-retaining members and a plurality of conductive members, wherein said shape-retaining members are at least substantially rigid, wherein said conductive members are conductive throughout the length of said conductive members, wherein at least a subset of said members are said shape-retaining members, wherein at least a subset of said members are said conductive members, wherein at least one said connector is attached to said member;
- a power source, wherein said power source is secured to at least one said connector attached to at least one said member;
- a plurality of LED light sources, wherein each said light source is secured to at least one said connector attached to at least one said member;
- a plurality of bases, wherein each said base is secured on at least one said member and positioned in proximity to at least one said connector;
- a plurality of covers, wherein each said LED light source is covered by at least one said cover and wherein each said cover is secured to at least one said base.

20. A method for assembling a modular lighting assembly that is at least substantially rigid, comprising:
- securing a base on a first member that includes a first connector;
- attaching a light source to the first connector;
- positioning a cover over the light source by connecting the cover to the base;
- linking a second member to a power source;
- linking said first member to said second member using a second connector;
- wherein at least one member is a coated steel tube and at least one member is a hollow plastic rod.

* * * * *